United States Patent
Komorida et al.

(10) Patent No.: US 10,613,953 B2
(45) Date of Patent: Apr. 7, 2020

(54) START TEST METHOD, SYSTEM, AND RECORDING MEDIUM

(71) Applicant: FUJITSU LIMITED, Kawasaki-shi, Kanagawa (JP)

(72) Inventors: Taku Komorida, Fuchu (JP); Atsushi Takami, Kawasaki (JP); Masato Fukumori, Chofu (JP); Haruhiko Ueno, Sagamihara (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 15/805,186

(22) Filed: Nov. 7, 2017

(65) Prior Publication Data

US 2018/0157566 A1  Jun. 7, 2018

(30) Foreign Application Priority Data

Dec. 1, 2016  (JP) .................................. 2016-234475

(51) Int. Cl.
*G06F 11/22* (2006.01)

(52) U.S. Cl.
CPC ................................ *G06F 11/2284* (2013.01)

(58) Field of Classification Search
CPC ............... G06F 11/076; G06F 11/2268; G06F 11/2278; G06F 11/2284; G06F 11/263; G06F 11/2635; G06F 9/4401; G06F 9/4403; G06F 9/4405; G06F 9/445; G06F 9/44505

See application file for complete search history.

(56) References Cited

U.S. PATENT DOCUMENTS

| | | | | | |
|---|---|---|---|---|---|
| 6,014,744 | A | * | 1/2000 | McKaughan | G06F 9/4401 713/100 |
| 6,216,226 | B1 | * | 4/2001 | Agha | G06F 11/1417 713/1 |
| 6,640,316 | B1 | * | 10/2003 | Martin | G06F 11/1417 714/2 |
| 7,555,677 | B1 | * | 6/2009 | Wiley | G06F 11/2284 713/1 |

(Continued)

FOREIGN PATENT DOCUMENTS

| | | |
|---|---|---|
| JP | 10-035061 | 2/1998 |
| JP | 2001-201527 | 7/2001 |
| JP | 2009-139313 | 6/2009 |

*Primary Examiner* — Gabriel Chu
(74) *Attorney, Agent, or Firm* — Fujitsu Patent Center

(57) ABSTRACT

A start test method executed by a system including a calculation device and a management device that manages failure information on the calculation device, the start test method includes storing, by a first processor included in the management device, a failure rate that has been calculated for each of parts of the calculation device based on the failure information received from the calculation device as performance information, associating with time information and a part of the calculation device; obtaining a failure rate of each of the parts at a time of start of the calculation device based on the performance information and a time when the calculation device is to be started; notifying the calculation device of the obtained failure rate; and executing, by a second processor included in the calculation device, a start test of the calculation device in accordance with the notified failure rate.

14 Claims, 18 Drawing Sheets

(56) References Cited

U.S. PATENT DOCUMENTS

| | | | |
|---|---|---|---|
| 2005/0229042 A1* | 10/2005 | Crowell | G06F 11/2284 |
| | | | 714/36 |
| 2010/0223507 A1* | 9/2010 | Narushima | H04N 1/00344 |
| | | | 714/47.1 |
| 2013/0132775 A1* | 5/2013 | Onoue | G06Q 10/063 |
| | | | 714/33 |
| 2015/0074367 A1* | 3/2015 | Cher | G06F 11/008 |
| | | | 711/165 |
| 2016/0378602 A1* | 12/2016 | Herzi | G06F 11/1417 |
| | | | 714/2 |
| 2019/0138431 A1* | 5/2019 | Holbrook | G06F 11/3688 |

* cited by examiner

FIG. 2

| DIAGNOSIS LOCATION | DIAGNOSIS LOCATION FAILURE PROPORTION | FAILURE RATE | DIAGNOSIS IMPLEMENTATION CONDITION |
|---|---|---|---|
| DIAGNOSIS LOCATION α | 40/100 | 0.04 | FAILURE RATE 0.01 % OR MORE |
| DIAGNOSIS LOCATION β | 30/100 | 0.03 | FAILURE RATE 0.02 % OR MORE |
| DIAGNOSIS LOCATION γ | 20/100 | 0.02 | FAILURE RATE 0.05 % OR MORE |
| DIAGNOSIS LOCATION δ | 10/100 | 0.01 | FAILURE RATE 0.10 % OR MORE |

FIG. 8

| CONFIGURATION ELEMENT | DIAGNOSIS CONTENT | DIAGNOSIS IMPLEMENTATION CONDITION |
|---|---|---|
| CPU | DIAGNOSIS C#1 | FAILURE RATE 0.005% OR MORE |
| | DIAGNOSIS C#2 | FAILURE RATE 0.050% OR MORE |
| | DIAGNOSIS C#3 | FAILURE RATE 0.015% OR MORE |
| | DIAGNOSIS C#4 | FAILURE RATE 0.005% OR MORE |
| MAIN STORAGE DEVICE | DIAGNOSIS M#1 | FAILURE RATE 0.010% OR MORE |
| | DIAGNOSIS M#2 | FAILURE RATE 0.015% OR MORE |
| | DIAGNOSIS M#3 | FAILURE RATE 0.010% OR MORE |
| PCIRT | DIAGNOSIS P#1 | FAILURE RATE 0.005% OR MORE |
| | DIAGNOSIS P#2 | FAILURE RATE 0.015% OR MORE |
| | DIAGNOSIS P#3 | FAILURE RATE 0.010% OR MORE |
| ⋮ | ⋮ | ⋮ |

FIG. 9A

| 31 | | 16 | 15 | | 0 |
|---|---|---|---|---|---|
| FAILURE DETECTION DATE AND TIME | | | | | |
| (ELAPSED TIME FROM 0:00 AM, JANUARY 1, 1970) | | | | | |
| | | | | FAILURE LOCATION CODE | |

FIG. 9B

| 31 | | 16 | 15 | | 0 |
|---|---|---|---|---|---|
| FAILURE DETECTION DATE AND TIME | | | | | |
| (ELAPSED TIME FROM 0:00 AM, JANUARY 1, 1970) | | | | | |
| | | | | FAILURE LOCATION CODE | |

FIG. 9C

| 31 | | 16 | 15 | | 0 |
|---|---|---|---|---|---|
| FAILURE DETECTION DATE AND TIME | | | | | |
| (ELAPSED TIME FROM 0:00 AM, JANUARY 1, 1970) | | | | | |
| | | | | FAILURE LOCATION CODE | |

FIG. 10

| VALUE | FAILURE LOCATION |
|---|---|
| 0x00 | NON-SETTING |
| 0x01 | CPU |
| 0x02 | MAIN STORAGE DEVICE |
| 0x05 | PCIRT |
| 0x06 | HDDCtlr |
| 0x07 | HDD |

START TEST METHOD, SYSTEM, AND RECORDING MEDIUM

CROSS-REFERENCE TO RELATED APPLICATION

This application is based upon and claims the benefit of priority of the prior Japanese Patent Application No. 2016-234475, filed on Dec. 1, 2016, the entire contents of which are incorporated herein by reference.

FIELD

The embodiments discussed herein are related to a start test method, a system, and a recording medium.

BACKGROUND

Recently, a parallel processing device has been utilized in which calculation units are coupled to each other and cooperate to make calculations. In the parallel processing device, when a baseboard management controller (BMC) that controls a power source in a calculation unit starts the calculation unit, a program called a power on self-test (POST) that performs initialization and diagnosis of hardware is executed on a central processing unit (CPU). After that, an operating system (OS) is started, and the calculation unit may perform various calculations.

The POST executes diagnosis processing in order to check whether pieces of hardware such as the CPU and a main storage device included in the calculation unit are in proper use. When a failure of hardware has been detected in the diagnosis processing, the POST notifies the BMC of a failure result.

There is a technology in which a time taken for self-diagnosis at the normal operation of a printing device is reduced by storing information indicating that a serious issue has occurred in the printing device, and performing detailed self-diagnosis in the printing device as compared with the self-diagnosis at the time of normal power-on when the power is turned on after the serious issue has occurred (for example, Japanese Laid-open Patent Publication No. 10-35061).

There is a technology by which a test is conducted in order from a test item in which a failure location is highly probably detected, and a failure detection time is reduced by storing data in which a self-diagnostic result of a test object and order of test items are associated with each other and rearranging the test items depending on the self-diagnostic result (for example, Japanese Laid-open Patent Publication No. 2001-201527).

There is a technology by which the reliability of an inspection device is maintained by allowing the setting of a content of self-diagnosis of an inspection circuit that inspects an inspection target device to be changed by a content in which an inspection is not allowed (for example, Japanese Laid-open Patent Publication No. 2009-139313).

In the diagnosis by the POST, it is desirable to execute diagnosis processing in further detail in order to reliably detect a failure, but it takes a longer time as the diagnosis processing is executed in further detail, and the time at which the calculation is started by the calculation unit is delayed. In the related art, the detail level of the diagnosis by the POST has been statically determined depending on a configuration of hardware, so that a problem occurs in which a specific time is taken for the diagnosis. In view of the above-described problem, it is desirable that a diagnosis time is reduced.

SUMMARY

According to an aspect of the invention, a start test method executed by a system including a calculation device and a management device that manages failure information on the calculation device, the start test method includes storing, by a first processor included in the management device, a failure rate that has been calculated for each of parts of the calculation device based on the failure information received from the calculation device as performance information, associating with time information and a part of the calculation device; obtaining a failure rate of each of the parts at a time of start of the calculation device based on the performance information and a time when the calculation device is to be started; notifying the calculation device of the obtained failure rate; and executing, by a second processor included in the calculation device, a start test of the calculation device in accordance with the notified failure rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a method in which a diagnosis location is changed;

FIG. 8 is a diagram illustrating an example of a diagnosis table;

FIG. 9A is a diagram illustrating an example of a data format of failure information notification from a POST to a BMC;

FIG. 9B is a diagram illustrating an example of a data format of failure information notification from an OS to the BMC;

FIG. 9C is a diagram illustrating an example of a data format of failure information notification from the BMC to a failure information management device;

FIG. 10 is a diagram illustrating an example of a failure location code;

DESCRIPTION OF EMBODIMENTS

Embodiments of a failure information management program, a start test method, and a parallel processing device of the technology discussed herein are described below in detail with reference to the drawings. The technology discussed herein is not limited to such embodiments.

Figure 1:
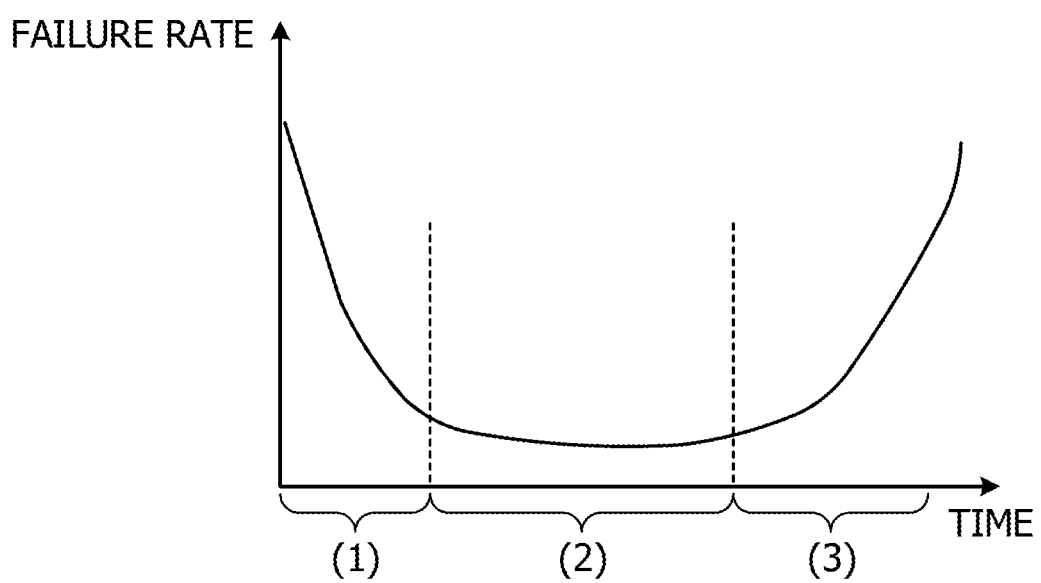
FIG. 1 is a diagram illustrating a relationship between a time and a failure rate (bathtub curve)

First, a diagnosis method according to an embodiment is described with reference to FIGS. 1 to 3. FIG. 1 is a diagram illustrating a relationship between a time and a failure rate (bathtub curve). Here, the failure rate is a rate in which hardware is failed per unit of time. The failure rate transitions over the passage of time as represented by the curve such as a bathtub in FIG. 1.

The bathtub curve is divided into the following three time periods.

(1) Initial failure period: A failure mainly occurs due to manufacturing defect, and the failure rate is reduced over the passage of time.

(2) Accidental failure period: The failure rate becomes approximately fixed regardless of the passage of time.

(3) Wear failure period: The failure rate increases over the passage of time due to wear of hardware.

Therefore, for diagnosis in the embodiment, in a case in which the failure rate is high such as the initial failure period and the wear failure period, the detail level of the diagnosis is increased, and in a case in which the failure rate is low such as the accidental failure period, the detail level of the diagnosis is reduced. That is, in the diagnosis in the embodiment, the detail level of the diagnosis is dynamically changed depending on a failure rate.

As a method in which the detail level of the diagnosis is changed, there are a method in which a diagnosis location is changed and a method in which the detail level of the diagnosis is changed in a diagnosis location. FIG. 2 is a diagram illustrating a method in which a diagnosis location is changed. In FIG. 2, a diagnosis location failure proportion indicates a proportion of a failure that occurs in each diagnosis location of the whole diagnosis locations. A failure rate in each of the diagnosis locations becomes a value obtained by multiplying the whole failure rate by the diagnosis location failure proportion. A diagnosis implementation condition indicates a condition under which diagnosis is performed in each of the diagnosis locations.

When it is assumed that the whole failure rate is 0.10%, a failure rate of a diagnosis location α is "0.10×40/100=0.04%", and a failure rate of a diagnosis location β is "0.10×30/100=0.03%". A failure rate of a diagnosis location γ is "0.10×20/100=0.02%", and a failure rate of a diagnosis location δ is "0.10×10/100=0.01%".

Thus, in each of the diagnosis location α and the diagnosis location β, the diagnosis implementation condition is satisfied, so that the diagnosis is performed. In addition, in each of the diagnosis location γ and the diagnosis location δ, the diagnosis implementation condition is not satisfied, so that the diagnosis is not performed.

Figure 3:
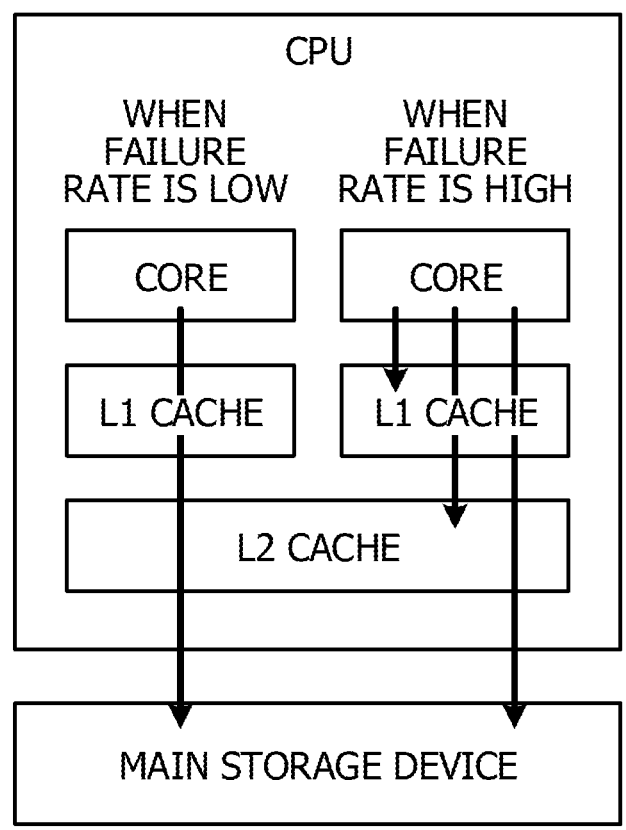
FIG. 3 is a diagram illustrating a method in which a detail level of diagnosis is changed in a diagnosis location.

FIG. 3 is a diagram illustrating a method in which a detail level of diagnosis is changed in a diagnosis location. FIG. 3 illustrates a case in which access diagnosis is performed from a core of the CPU to the main storage device. In order to check an access from the core to the main storage device, it is typically desirable that access diagnosis to an L1 cache, access diagnosis to an L2 cache, and access diagnosis to the main storage device are performed in order.

However, when the failure rate is low, the access diagnosis to the main storage device is performed without the access diagnosis to the L1 cache and the access diagnosis to the L2 cache. In addition, when the failure rate is high, all of the access diagnosis from the core to the L1 cache, the access diagnosis from the core to the L2 cache through the L1 cache, and the access diagnosis from the core to the main storage device through the L1 cache and the L2 cache are performed. As described above, in the access diagnosis to the main storage device, the number of diagnoses may be reduced not by changing the diagnosis location but by changing the detail level of the diagnosis in the diagnosis location.

Figure 4:
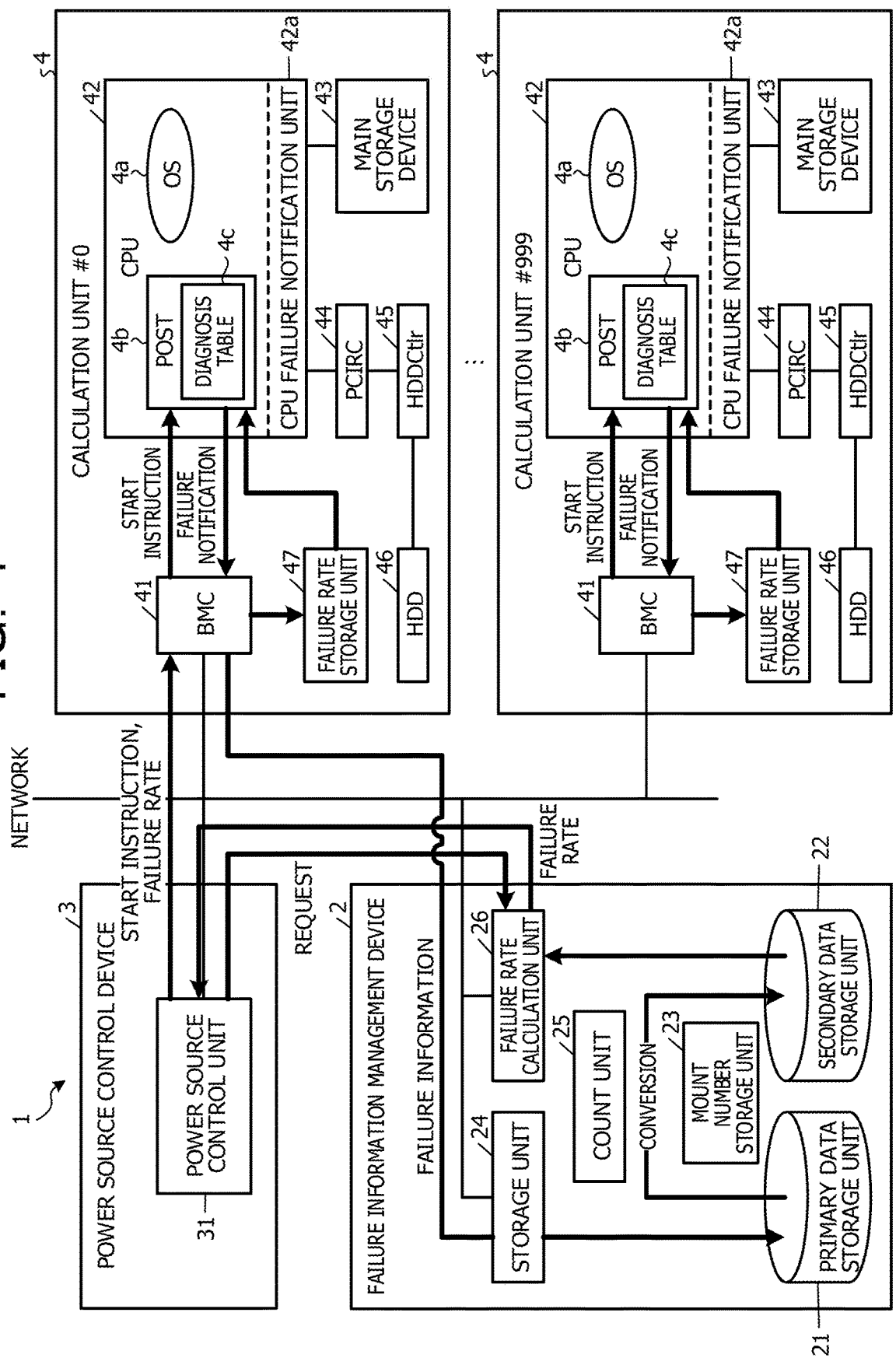
FIG. 4 is a diagram illustrating a configuration of a parallel processing device according to an embodiment.

A configuration of a parallel processing device according to the embodiment is described below. FIG. 4 is a diagram illustrating the configuration of the parallel processing device according to the embodiment. As illustrated in FIG. 4, a parallel processing device 1 according to the embodiment includes a failure information management device 2, a power source control device 3, and 1000 calculation units 4 referred to as calculation units #0 to #999. Here, the parallel processing device 1 includes the 1000 calculation units 4, but may include calculation units 4 the number of which are more or less than 1000. The failure information management device 2 and the power source control device 3 may be collectively used as a single device.

The failure information management device 2 manages information on a failure that has occurred in each of the calculations unit 4. The power source control device 3 controls power source of the calculation unit 4. The calculation unit 4 executes calculation processing with other calculation units 4.

The failure information management device 2 includes a primary data storage unit 21, a secondary data storage unit 22, a mount number storage unit 23, a storage unit 24, a count unit 25, and a failure rate calculation unit 26.

Figure 5:
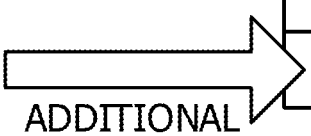
FIG. 5 is a diagram illustrating an example of primary data.

The primary data storage unit 21 stores a log of a failure that has occurred in each of the calculation units 4 as primary data. FIG. 5 is a diagram illustrating an example of primary data. As illustrated in FIG. 5, the primary data is data indicating a failure detection date and time and a failure location for each failure.

The failure detection date and time is a date and time in which a failure has been detected. The failure detection date and time is represented by MMDDYYYYHHMMSS. Here, "MM" represents a month. "DD" represents a day. "YYYY" represents a year on the Gregorian calendar. "HH" represents an hour. "MM" represents a minute. "SS" represents a second. The failure location is a hardware part at which the failure has been detected. The failure location indicates a peripheral component interconnect (PCI), a main storage device, a CPU, or the like. An entry is added to the primary data each time a failure occurs.

Figure 6:
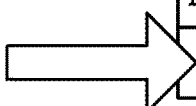
FIG. 6 is a diagram illustrating an example of secondary data.

The secondary data storage unit 22 stores a failure rate for each of the failure locations at specific intervals as secondary data. FIG. 6 is a diagram illustrating an example of secondary data. As illustrated in FIG. 6, the secondary data is data indicating a failure rate and a calculation date and time of each of hardware parts at the specific intervals. The specific interval is, for example, 24 hours from 0 o'clock to 24 o'clock. The calculation date and time is a date and time at which a failure rate has been calculated. The calculation date and time is represented by "MMDDYYYYHH".

The failure rate is calculated at the specific intervals, and an entry is added to the secondary data. In FIG. 6, as hardware parts, merely a CPU 42, a main storage device 43, and a PCI root complex (PCIRC) 44 are illustrated, but the secondary data storage unit 22 stores a failure rate for another hardware part such as a hard disk drive (HDD) Ctrl 45 or the like.

The mount number storage unit 23 stores the number of hardware parts mounted on the calculation units #0 to #999. That is, the mount number storage unit 23 stores the number of CPUs, the number of main storage devices, the number of PCIRCs, and the like, which are mounted on the calculation units #0 to #999.

The storage unit 24 receives failure information from each of the calculation units 4 and stores a failure detection date and time and a failure location in the primary data storage unit 21.

The count unit 25 creates a single entry of the secondary data from the primary data at the specific intervals, and stores the entry in the secondary data storage unit 22. That is, the count unit 25 counts the number of occurred failures in each of the failure locations within the specific interval, calculates a failure rate of the failure location, and adds the failure rate in the secondary data storage unit 22.

When the failure rate calculation unit 26 receives an obtaining request of a failure rate from the power source control device 3, the failure rate calculation unit 26 calculates a failure rate at the time of the start of the calculation unit 4 based on the secondary data and sends back the failure rate to the power source control device 3. The failure rate calculation unit 26 calculates the failure rate for each of the failure locations and sends back the failure rate to the power source control device 3.

Figure 7:
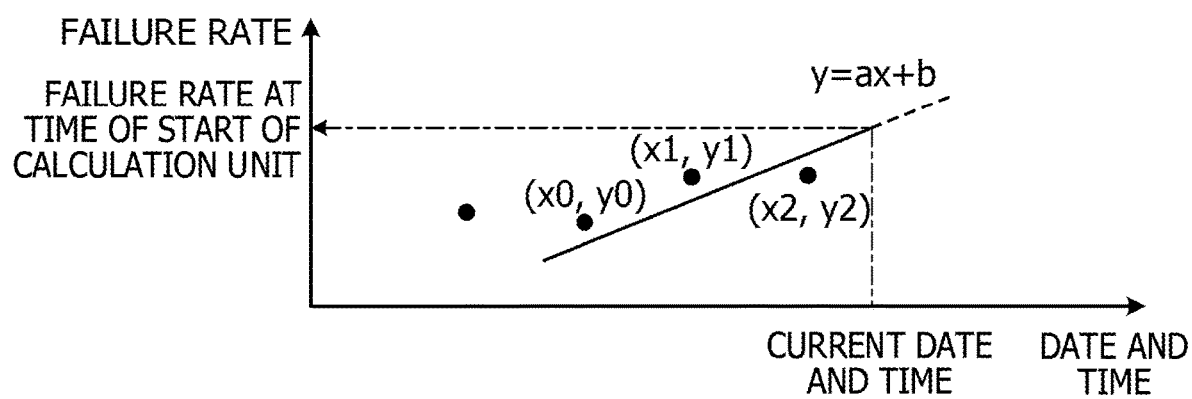
FIG. 7 is a diagram illustrating a calculation method of a failure rate at the time of the start of a calculation unit.

FIG. 7 is a diagram illustrating a calculation method of a failure rate at the time of the start of the calculation unit 4. The failure rate calculation unit 26 obtains an approximate primary straight line "y=ax+b" of a date and time and a failure rate by a least squares method using the three recent failure rates up to the current date and time in the secondary data.

In FIG. 7, it is assumed that the three recent failure rates up to the current date and time are $x_0$, $x_1$, and $x_2$ in chronological order, and the corresponding failure rates are $y_0$, $y_1$, and $y_2$. The three recent failure rates are used in order to obtain a failure rate at the time of the start of the calculation unit 4 so that a rapid increase in the failure rate is dealt with quickly when the period is changed from the accidental failure period to the wear failure period.

When an approximate straight line is obtained, the failure rate calculation unit 26 converts a variable using $x_0$ as a reference in order to avoid divergence of calculation results. That is, for "i=0, 1, 2", the failure rate calculation unit 26 sets "$u_i=x_i-x_0$" and "$v_i=y_i$". In addition, the failure rate calculation unit 26 calculates a coefficient of the approximate straight line by the following equation (1) using a three-points least squares method.

$$\begin{cases} a = \dfrac{3\sum u_i v_i - \sum u_i \sum v_i}{3\sum u_i^2 - (\sum u_i)^2} \\ b = \dfrac{\sum u_i^2 \sum v_i - \sum u_i \sum u_i v_i}{3\sum u_i^2 - (\sum u_i)^2} \end{cases} \quad (1)$$

The failure rate calculation unit 26 obtains a failure rate $y_t$ of the current date and time $x_t$ as the failure rate at the time of the start of the calculation unit 4, based on "$y_t=ax(x_t-x_0)+b$" using the calculated approximate straight line. When the number of entries in the secondary data is less than three, the failure rate calculation unit 26 sets the failure rate at the time of the start of the calculation unit 4 at 100%. That is, when there is not enough failure information right after the operation of the calculation unit 4, the calculation unit 4 performs diagnosis by maximizing the detail level.

Returning to FIG. 4, the power source control device 3 includes a power source control unit 31. The power source control unit 31 instructs a BMC 41 of the calculation unit 4 to start or end. The power source control unit 31 transmits a failure rate to the BMC 41 when the power source control unit 31 instructs the BMC 41 to be started.

The calculation unit 4 includes the BMC 41, the CPU 42, the main storage device 43, the PCIRC 44, the HDDCtlr 45, the HDD 46, and a failure rate storage unit 47.

The BMC 41 controls the power source in the calculation unit 4. When the BMC 41 receives a failure rate from the power source control unit 31 with a start instruction, the BMC 41 stores the received failure rate in the failure rate storage unit 47.

The CPU 42 is a central processing device that reads a program from the main storage device 43 and executes the program. The CPU 42 includes a CPU failure notification unit 42a. The CPU failure notification unit 42a is hardware that notifies an OS 4a or a POST 4b of detection of a failure when the failure has been detected in the CPU 42. The calculation unit 4 may include a plurality of CPUs 42.

In the CPU 42, the OS 4a and the POST 4b are executed. The POST 4b is started when the BMC 41 has notified the CPU 42 of the start instruction, and the POST 4b performs initialization and diagnosis of the hardware of the calculation unit 4. The POST 4b includes a diagnosis table 4c. The diagnosis table 4c is a table in which the detail level of diagnosis is defined for each of the hardware parts.

FIG. 8 is a diagram illustrating an example of the diagnosis table 4c. As illustrated in FIG. 8, the diagnosis table 4c is a table in which a diagnosis content corresponds to a diagnosis implementation condition for each of the hardware parts. The diagnosis content is a content of diagnosis in accordance with the detail level of the diagnosis. Each of diagnosis contents has a different diagnosis location and a different detail level for the diagnosis location. The diagnosis implementation condition is a condition in which the corresponding diagnosis content is performed. For example, the POST 4b performs a content of diagnosis C #1 when the failure rate is 0.005% or more for the CPU 42.

When the POST 4b detects a failure, the POST 4b notifies the BMC 41 of failure information. FIG. 9A is a diagram illustrating an example of a data format of failure information notification from the POST 4b to the BMC 41. In FIG. 9A, "0" to "31" indicate bit positions. As illustrated in FIG. 9A, the failure information notification from the POST 4b to the BMC 41 is data of 12 bytes. The initial eight bytes correspond to a failure detection date and time indicated by an elapsed time from 0:00 am, in Jan. 1, 1970. One byte of the bit positions 0 to 7 from among the following four bytes indicates a failure location code. The failure location code is a code indicating the failure location.

FIG. 10 is a diagram illustrating an example of a failure location code. As illustrated in FIG. 10, for example, a value of a code of the CPU 42 is 0×01. Here, "0×" indicates a hexadecimal.

When the POST 4b or the OS 4a notifies the BMC 41 of a failure, the BMC 41 notifies the failure information management device 2 of the failure information. The OS 4a notifies the BMC 41 of the failure detected during the operation of the calculation unit 4. FIG. 9B is a diagram illustrating an example of a data format of failure information notification from the OS 4a to the BMC 41.

As illustrated in FIG. 9B, the failure information notification from the OS 4a to the BMC 41 is data of 12 bytes. The initial 8 bytes correspond to a failure detection date and time indicated by an elapsed time from 0:00 am, in Jan. 1, 1970. One byte of the bit positions 0 to 7 from among the following four bytes indicates a failure location code.

FIG. 9C is a diagram illustrating an example of a data format of failure information notification from the BMC 41 to the failure information management device 2. As illustrated in FIG. 9C, the failure information notification from the BMC 41 to the failure information management device 2 is data of 12 bytes. The initial 8 bytes correspond to a failure detection date and time indicated by an elapsed time from 0:00 am, in Jan. 1, 1970. One byte of the bit positions 0 to 7 from among the following four bytes indicates a failure location code.

Returning FIG. 4, the main storage device 43 is a memory that stores a program, an in-progress result of the program, and the like. The PCIRC 44 is a device that becomes a route of PCI connection, and is coupled to the CPU 42. The HDDCtlr 45 is a controller that controls the HDD 46. The HDD 46 is a disk device that stores a program and data.

The failure rate storage unit 47 stores a failure rate that the BMC 41 has received from the power source control device 3. The failure rate storage unit 47 stores a failure rate for each of the hardware parts in the calculation unit 4.

Figure 11:
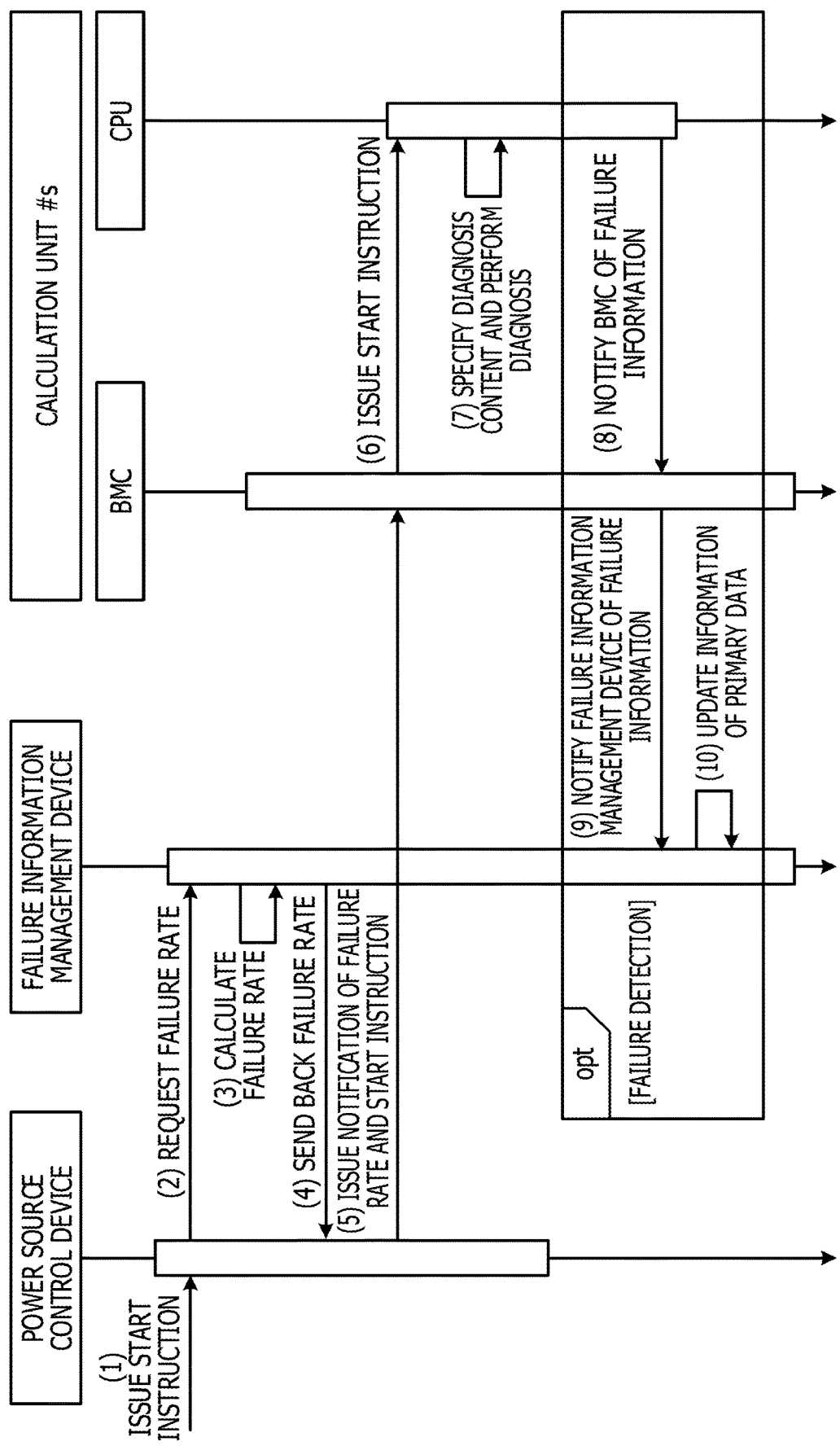
FIG. 11 is a sequence diagram illustrating a flow of processing from start instruction by a user to record of failure information.

A flow of processing from a start instruction by a user to record of failure information is described below. FIG. 11 is a sequence diagram illustrating the flow of the processing from the start instruction by the user to the record of the failure information.

As illustrated in FIG. 11, when the power source control device 3 receives a start instruction from the user (1), the power source control device 3 requests a failure rate from the failure information management device 2 (2). Therefore, the failure information management device 2 calculates a failure rate at the time of the start of the calculation unit 4 for each of the hardware parts (3), and sends back the calculated failure rate to the power source control device 3 (4). In addition, the power source control device 3 notifies each of BMCs 41 of all of the calculation units 4 of the failure rate and issues a start instruction to each of the BMCs 41 of all of the calculation units 4 (5). In FIG. 11, merely a calculation unit # s is illustrated on behalf of all of the calculation units 4. Here, "s" is any integer from 0 to 999.

The BMC 41 stores the failure rate in the failure rate storage unit 47 and issues a start instruction to the CPU 42 (6). The CPU 42 specifies a diagnosis content to be performed, using the failure rate in the failure rate storage unit 47 and the diagnosis table 4c, and performs the diagnosis (7). When there is no diagnosis content that satisfies a diagnosis implementation condition, the CPU 42 does not perform diagnosis.

In addition, when the CPU 42 has detected a failure, the CPU 42 notifies the BMC 41 of failure information (8). In FIG. 11, a square indicated by "opt" corresponds to a case in which a failure has been detected. The BMC 41 notified of the failure information notifies the failure information management device 2 of the failure information (9). In addition, the failure information management device 2 updates information of the primary data (10).

As described above, when the failure information management device 2 calculates a failure rate for each of the hardware parts, and the power source control device 3 notifies the calculation unit # s of the failure rate with the start instruction, the parallel processing device 1 may dynamically change the detail level of the diagnosis.

Figure 12:
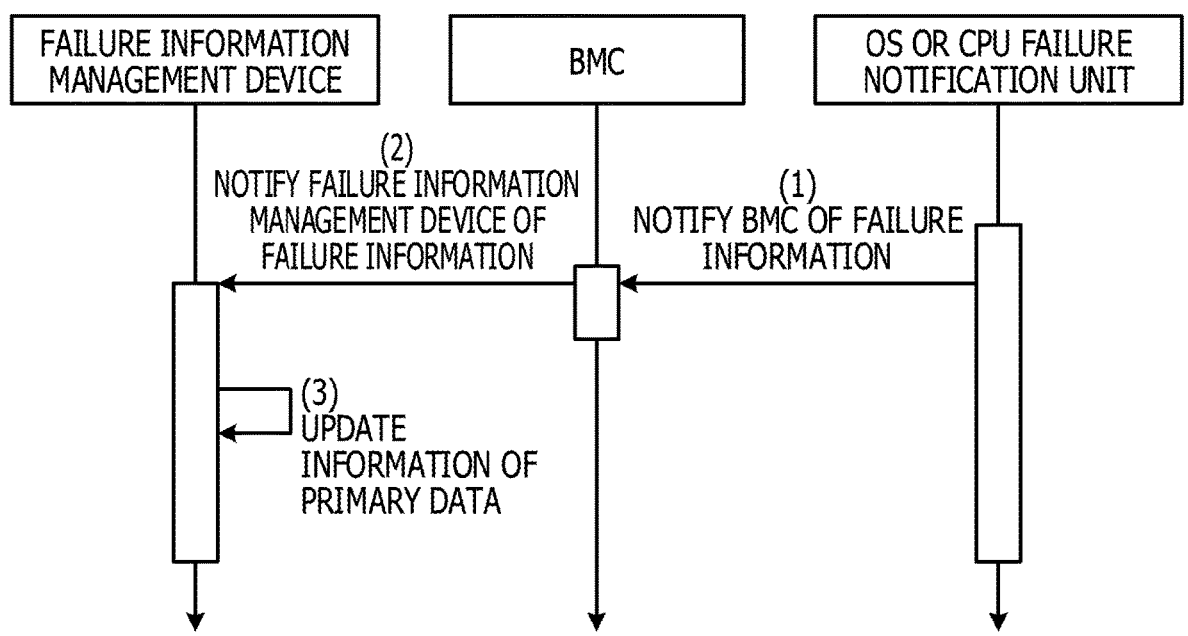
FIG. 12 is a sequence diagram illustrating a flow of processing when a failure has been detected during the operation of the calculation unit.

A flow of processing when a failure has been detected during the operation of the calculation unit 4 is described below. FIG. 12 is a sequence diagram illustrating the flow of the processing when a failure has been detected during the operation of the calculation unit 4. As illustrated in FIG. 12, when the OS 4a or the CPU failure notification unit 42a detects a failure, the OS 4a or the CPU failure notification unit 42a that has detected the failure notifies the BMC 41 of the failure information (1). Therefore, the BMC 41 notifies the failure information management device 2 of the failure information (2). In addition, the failure information management device 2 updates information of the primary data (3).

As described above, in a case in which the OS 4a or the CPU failure notification unit 42a has detected a failure, when the BMC 41 notifies the failure information management device 2 of the failure information, the failure information management device 2 may collect failure information during the operation of the calculation unit 4.

Figure 13:
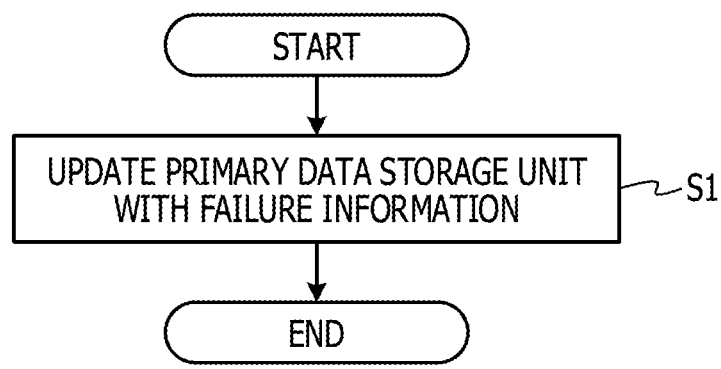
FIG. 13 is a flowchart illustrating a flow of processing by a storage unit.

A flow of processing by the storage unit 24 is described below. FIG. 13 is a flowchart illustrating the flow of the processing by the storage unit 24. As illustrated in FIG. 13, when the storage unit 24 receives failure information from the BMC 41, the storage unit 24 updates the primary data storage unit 21 with the failure information (S1).

As described above, when the storage unit 24 updates the primary data storage unit 21 using the failure information transmitted from the BMC 41, the failure information management device 2 may accumulate the failure information as the primary data.

Figure 14:
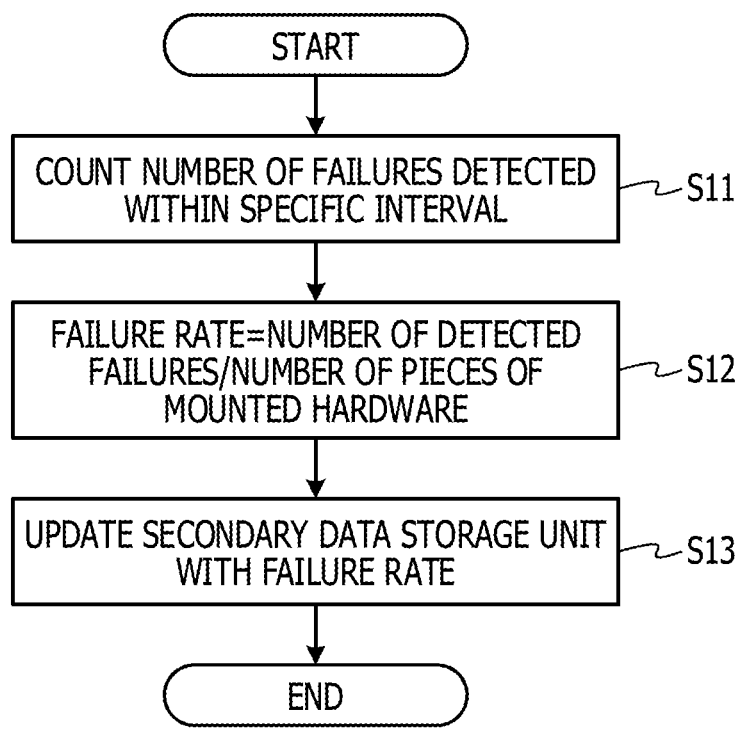
FIG. 14 is a flowchart illustrating a flow of processing by a count unit.

A flow of processing by the count unit 25 is described below. FIG. 14 is a flowchart illustrating the flow of the processing by the count unit 25. The count unit 25 executes processing illustrated in FIG. 14 for each of the hardware parts at specific intervals.

As illustrated in FIG. 14, the count unit 25 counts the number of failures detected within the specific interval based on the primary data (S11). In addition, the count unit 25 calculates a failure rate obtained by dividing the number of detected failures by the number of pieces of hardware mounted on the parallel processing device 1 (S12). Here, the number of pieces of hardware is stored in the mount number storage unit 23. In addition, the count unit 25 updates the secondary data storage unit 22 with the calculated failure rate (S13).

As described above, when the count unit 25 calculates a failure rate at the specific intervals based on the number of failures detected within the specific interval, the failure information management device 2 may calculate the failure rate at the time of the start of the calculation unit 4 with high accuracy.

Figure 15:
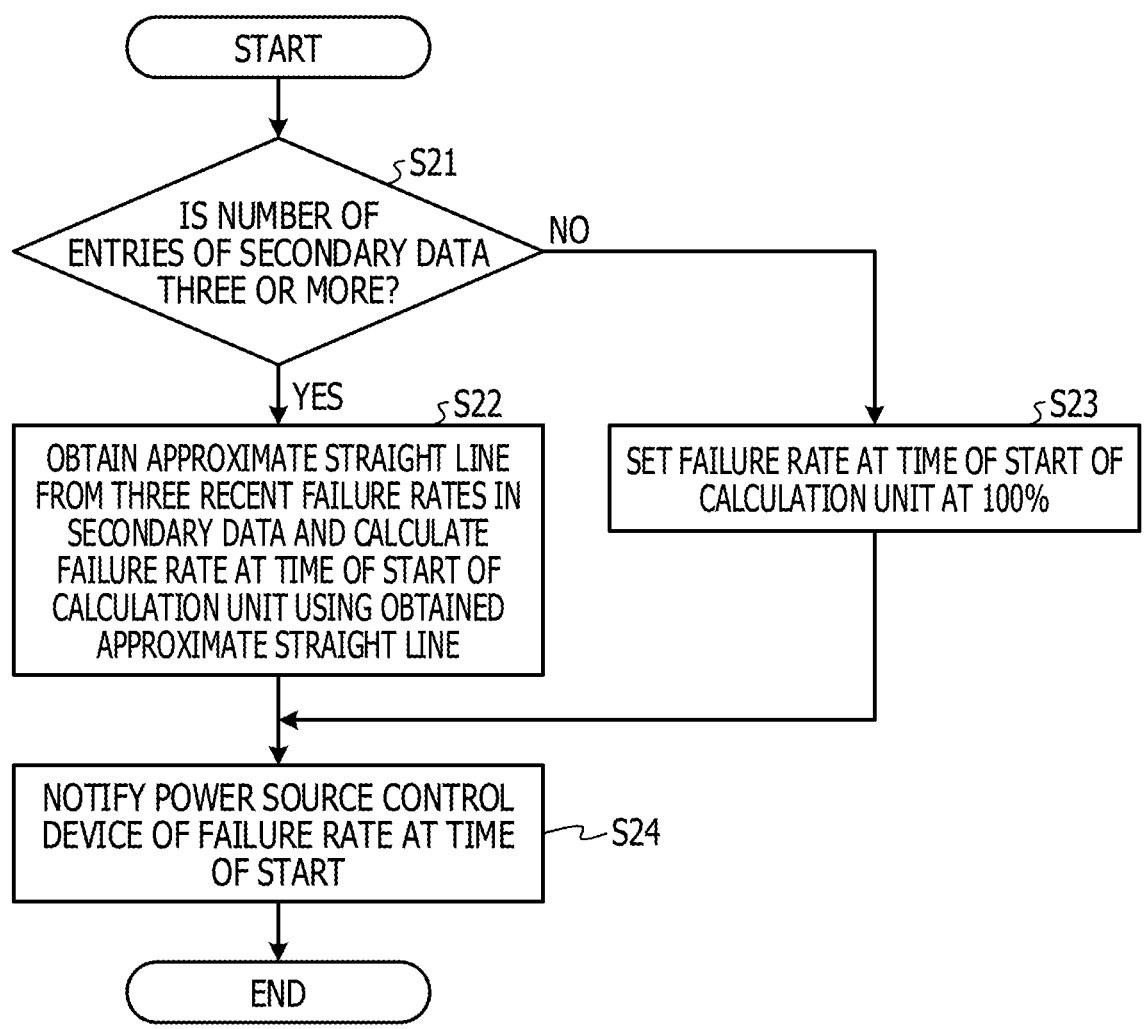
FIG. 15 is a flowchart illustrating a flow of processing by a failure rate calculation unit.

A flow of processing by the failure rate calculation unit 26 is described below. FIG. 15 is a flowchart illustrating the flow of the processing by the failure rate calculation unit 26. As illustrated in FIG. 15, the failure rate calculation unit 26 determines whether the number of entries of the secondary data is three or more (S21).

In addition, when the number of entries of the secondary data is three or more, the failure rate calculation unit 26 obtains an approximate straight line from the three recent failure rates in the secondary data, and calculates a failure rate at the time of the start of the calculation unit 4 using the obtained approximate straight line (S22). On the other hand, when the number of entries in the secondary data is less than three, the failure rate calculation unit 26 sets the failure rate at the time of the start of the calculation unit 4 at 100% (S23). In addition, the failure rate calculation unit 26 notifies the power source control device 3 of the failure rate at the time of the start of the calculation unit 4 (S24).

As described above, the failure rate calculation unit 26 may calculate a failure rate at the time of the start of the calculation unit 4 with high accuracy using the three recent failure rates.

Figure 16:
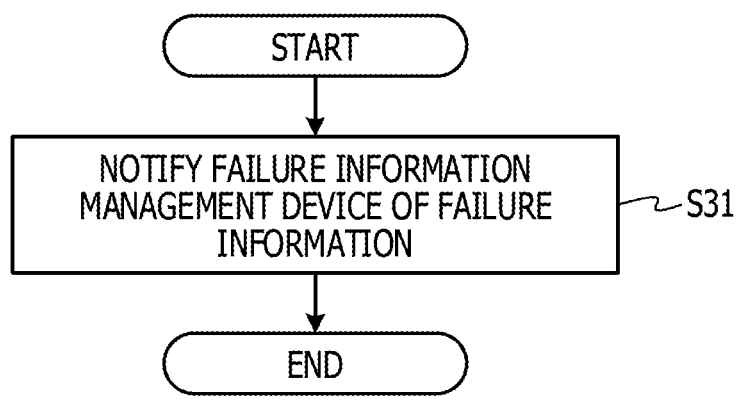
FIG. 16 is a flowchart illustrating a flow of processing of the BMC when the BMC has been notified of failure information.

A flow of processing of the BMC 41 when the BMC 41 has been notified of failure information is described below. FIG. 16 is a flowchart illustrating the flow of the processing of the BMC 41 when the BMC 41 has been notified of failure information. As illustrated in FIG. 16, the BMC 41 notifies the failure information management device 2 of the failure information (S31).

As described above, when the BMC 41 notifies the failure information management device 2 of the failure information, the failure information management device 2 may accumulate the failure information as the primary data.

Figure 17:
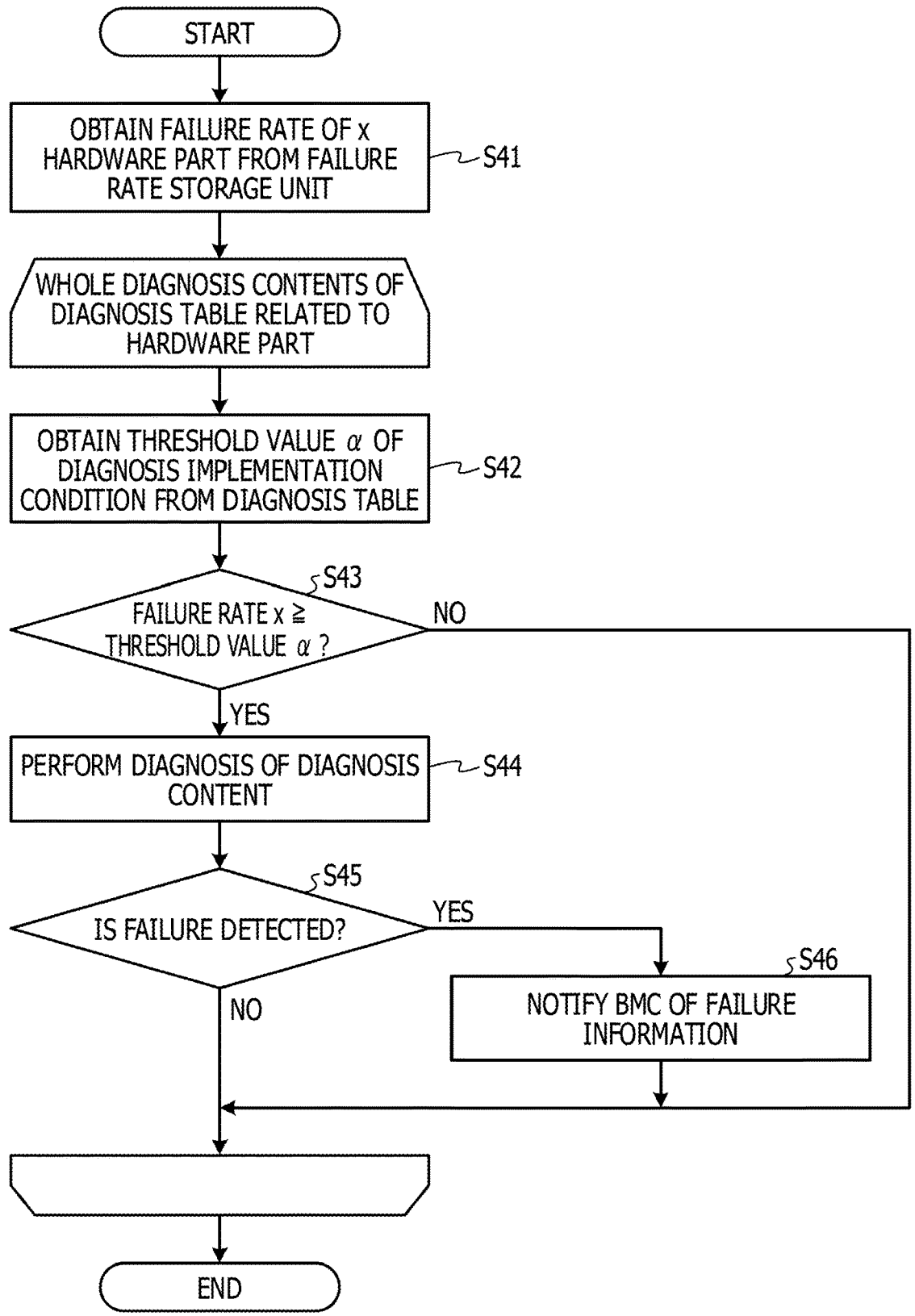
FIG. 17 is a flowchart illustrating a flow of processing by the POST.

A flow of processing by the POST 4b is described below. FIG. 17 is a flowchart illustrating the flow of the processing by the POST 4b. The POST 4b executes processing illustrated in FIG. 17 for each of the hardware parts.

As illustrated in FIG. 17, the POST 4b obtains a failure rate x of a hardware part that is a diagnosis target from the failure rate storage unit 47 (S41). In addition, the POST 4b executes processing of S42 to S46 for each of the diagnosis contents of the diagnosis table 4c for the hardware part that is the diagnosis target.

That is, the POST 4b obtains a threshold value a of the diagnosis implementation condition from the diagnosis table 4c (S42). In addition, the POST 4b determines whether the failure rate x is the threshold value a or more (S43), and executes the processing for the next diagnosis content when the failure rate x is less than the threshold value a.

On the other hand, when the failure rate x is the threshold value a or more, the POST 4b performs diagnosis of the diagnosis content (S44), and determines whether a failure has been detected (S45). In addition, when a failure has been detected, the POST 4b notifies the BMC 41 of the failure information (S46).

As described above, the POST 4b dynamically changes the detail level of the diagnosis and may reduce a diagnosis time by determining whether diagnosis having each of the diagnosis contents is performed based on the failure rate at the time of the start of the calculation unit 4 and the diagnosis table 4c.

As described above, in the embodiment, the count unit 25 of the failure information management device 2 calculates a failure rate of each of the hardware parts at the specific intervals, and updates the secondary data storage unit 22. In addition, the failure rate calculation unit 26 calculates a failure rate at the time of the start of the calculation unit 4 using the secondary data storage unit 22 for each of the hardware parts, in response to a request from the power source control device 3, and sends back the failure rate to the power source control device 3. In addition, the power source control device 3 notifies each of the calculation units 4 of the failure rate at the time of the start of the calculation unit 4 for each of the hardware parts, with a start instruction. Thus, each of the calculation units 4 may reduce a diagnosis time at the time of the start of the calculation unit 4 by dynamically changing the diagnosis content based on the failure rate at the time of the start of the calculation unit 4.

In the embodiment, the failure rate calculation unit 26 may accurately calculate the failure rate at the time of the start of the calculation unit 4 based on the three recent failure rates.

In the embodiment, the count unit 25 calculates a failure rate of each of the hardware parts at specific intervals such as 24 hours using the primary data, and updates the secondary data storage unit 22, so that the failure rate calculation unit 26 may calculate the failure rate at the time of the start of the calculation unit 4, using the recent failure rates.

In the embodiment, the storage unit 24 receives information on a failure detected by the diagnosis performed by each of the calculation units 4 and updates the primary data storage unit 21, so that the diagnosis result at the time of the start of the calculation unit 4 may be reflected in the calculation result of the failure rate.

In the embodiment, the failure information management device 2 is described above, but when a configuration included in the failure information management device 2 is realized by software, a failure information management program having a function similar to that of the failure information management device 2 may be obtained. Therefore, a computer that executes the failure information management program is described below.

Figure 18:
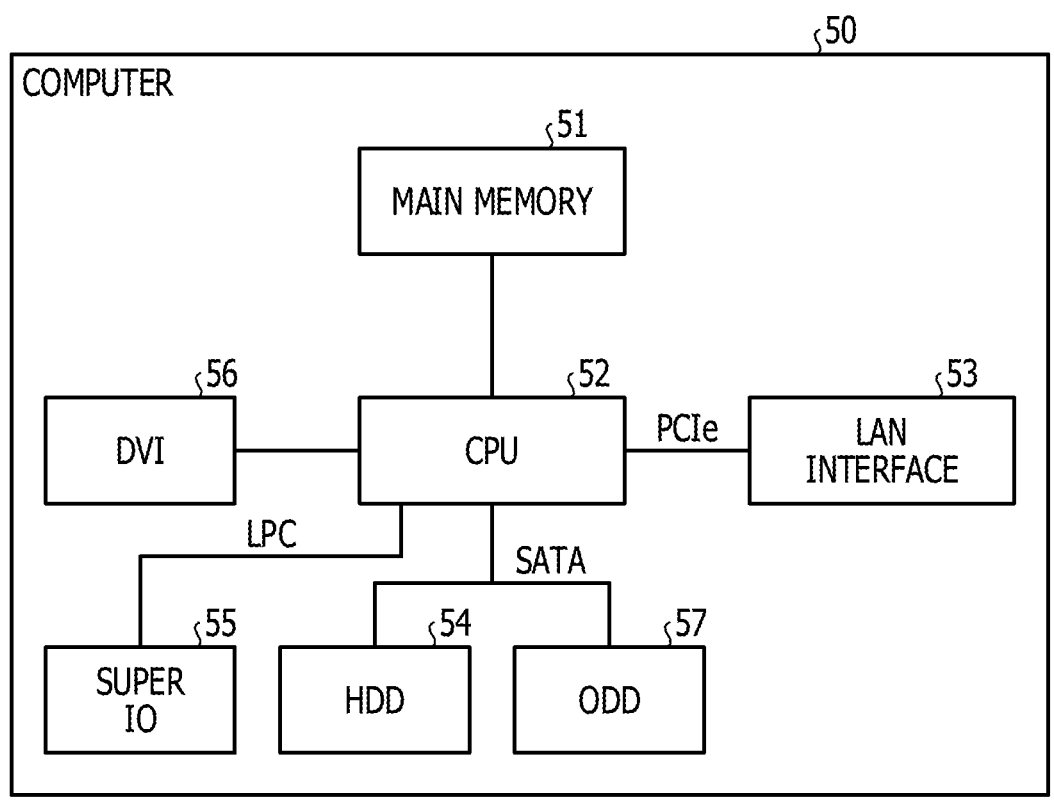
FIG. 18 is a diagram illustrating a hardware configuration of a computer that executes a failure information management program according to the embodiment.

FIG. 18 is a diagram illustrating a hardware configuration of a computer that executes the failure information management program according to the embodiment. As illustrated in FIG. 18, a computer 50 includes a main memory 51, a CPU 52, a local area network (LAN) interface 53, and an HDD 54. The computer 50 further includes a super input output (IO) 55, a digital visual interface (DVI) 56, and an optical disk drive (ODD) 57.

The main memory 51 is a memory that stores a program, an in-progress result of the program, and the like. The CPU 52 is a central processing device that reads a program from the main memory 51 and executes the program. The CPU 52 includes a chipset including a memory controller.

The LAN interface 53 is an interface to couple the computer 50 to another computer through a LAN. The HDD 54 is a disk device that stores a programs and data. The super IO 55 is an interface to couple input devices such as a mouse, a keyboard, and the like, to the computer 50. The DVI 56 is an interface that couples a liquid crystal display device to the computer 50. The ODD 57 is a device that performs reading and writing for a digital versatile disc (DVD).

The LAN interface 53 is coupled to the CPU 52 through PCI express (PCIe), and the HDD 54 and the ODD 57 are coupled to the CPU 52 through serial advanced technology attachment (SATA). The super IO 55 is coupled to the CPU 52 through a low pin count (LPC).

In addition, the failure information management program executed in the computer 50 is stored in a DVD, read from the DVD by the ODD 57, and installed into the computer 50. Alternatively, the failure information management program is stored in a database or the like of another computer system coupled to the computer 50 through the LAN interface 53, read from the database or the like, and installed to the computer 50. In addition, the installed failure information management program is stored in the HDD 54, read to the main memory 51, and executed by the CPU 52.

In the embodiments, the parallel processing device 1 is described above, but the technology discussed herein is not limited to such embodiments, and may also be applied to another device in which failure diagnosis is performed at the time of the start of the device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A start test method executed by a system including a calculation device and a management device that manages failure information on the calculation device, the start test method comprising:
    storing, by a first processor included in the management device, a failure rate that indicates a rate in which hardware is failed per unit of time and has been calculated for each of parts of the calculation device based on the failure information received from the calculation device as performance information, the failure rate being associated with a time when the failure has been detected and a part of the calculation device;
    when the calculation device is to be started, calculating an approximate line in which the time and the failure rate are used as parameters based on the performance information;
    calculating a failure rate of each of the parts at a start time of the calculation device by using the calculated approximate line;
    notifying the calculation device of the failure rate of each of the parts; and
    executing, by a second processor included in the calculation device, a start test of the calculation device in accordance with the failure rate of each of the parts.

2. The start test method according to claim 1, wherein the calculating includes calculating the failure rate of each of the parts based on a specific number of recent failure rates in the performance information.

3. The start test method according to claim 2, wherein the calculating the approximate line includes:
    calculating an approximate primary line in which a date and time and a failure rate are used as parameters is calculated by a least squares method using the specific number of recent failure rates, and
    calculating the failure rate of each of the parts at the time of the calculation device using the calculated approximate primary line.

4. The start test method according to claim 1, wherein the calculating the failure rate includes calculating a failure rate at specific intervals for each of the parts based on a failure occurrence date and time and a failure occurrence part included in the failure information.

5. The start test method according to claim 4, further comprising:
    receiving information on a failure detected by the start test conducted depending on the failure rate of each of the parts by the calculation device notified of the failure rate of each of the parts at the time of the start of the calculation device, by the first processor; and
    storing the received information by the first processor,
    wherein the storing of the performance information includes calculating the performance information using the stored information as the failure information.

6. The start test method according to claim 1, wherein the executing includes:
    determining a diagnosis content so that a detail level becomes high as the failure rate of each of the parts is high, and
    executing the start test based on the determined diagnosis content.

7. The start test method according to claim 1, wherein the executing includes:
    specifying a diagnosis content corresponding to the part and the notified failure rate by referring to diagnosis information in which a part, a diagnosis content, and a failure rate are associated with each other for each of a plurality of diagnosis contents, and
    executing the start test based on the specified diagnosis content.

8. A system comprising:
    a management device including a first processor; and
    a calculation device that is coupled to the management device and includes a second processor, wherein
    the first processor is configured to:
        store a failure rate that indicates a rate in which hardware is failed per unit of time and has been calculated for each of parts of the calculation device based on the failure information received from the calculation device as performance information, the failure rate being associated with a time when the failure has been detected and a part of the calculation device,
        when the calculation device is to be started, calculate an approximate line in which the time and the failure rate are used as parameters based on the performance information,
        calculate a failure rate of each of the parts at a start time of the calculation device by using the calculated approximate line, and
        notify the calculation device of the failure rate of each of the parts, and the second processor is configured to
        execute a start test of the calculation device in accordance with the failure rate of each of the parts.

9. The system according to claim 8, wherein the first processor is configured to calculate the failure rate of each of the parts based on a specific number of recent failure rates in the performance information.

10. The system according to claim 9, wherein the approximate line is an approximate primary line in which a date and time and a failure rate are used as parameters is calculated by a least squares method using the specific number of recent failure rates, and
    the first processor is configured to calculate the failure rate of each of the parts at the time of the calculation device using the calculated approximate primary line.

11. The system according to claim 8, wherein the first processor is configured to calculate a failure rate at specific intervals for each of the parts based on a failure occurrence date and time and a failure occurrence part included in the failure information.

12. The system according to claim 11, wherein the first processor is configured to:
receive information on a failure detected by the start test conducted depending on the failure rate of each of the parts by the calculation device notified of the failure rate of each of the parts at the time of the start of the calculation device,
store the received information, and
calculate the performance information using the stored information as the failure information.

13. The system according to claim 8, wherein the second processor is configured to:
determine a diagnosis content so that a detail level becomes high as the failure rate of each of the parts is high, and
execute the start test based on the determined diagnosis content.

14. A non-transitory computer-readable recording medium storing a program that causes a first processor and a second processor included in a management device that manages failure information on a calculation device to execute a process, the process comprising:

storing, by the first processor, a failure rate that indicates a rate in which hardware is failed per unit of time and has been calculated for each of parts of the calculation device based on the failure information received from the calculation device as performance information, the failure rate being associated with time information a time when the failure has been detected and a part of the calculation device;

when the calculation device is to be started, calculating a failure rate of each of the parts at a time of start of the calculation device an approximate line in which the time and the failure rate are used as parameters based on the performance information and a time when the calculating is performed;

calculating a failure rate of each of the parts at a start time of the calculation device by using the calculated approximate line;

notifying the calculation device of the failure rate of each of the parts; and executing, by the second processor, a start test of the calculation device in accordance with the failure rate of each of the parts.

* * * * *